Figure 3:
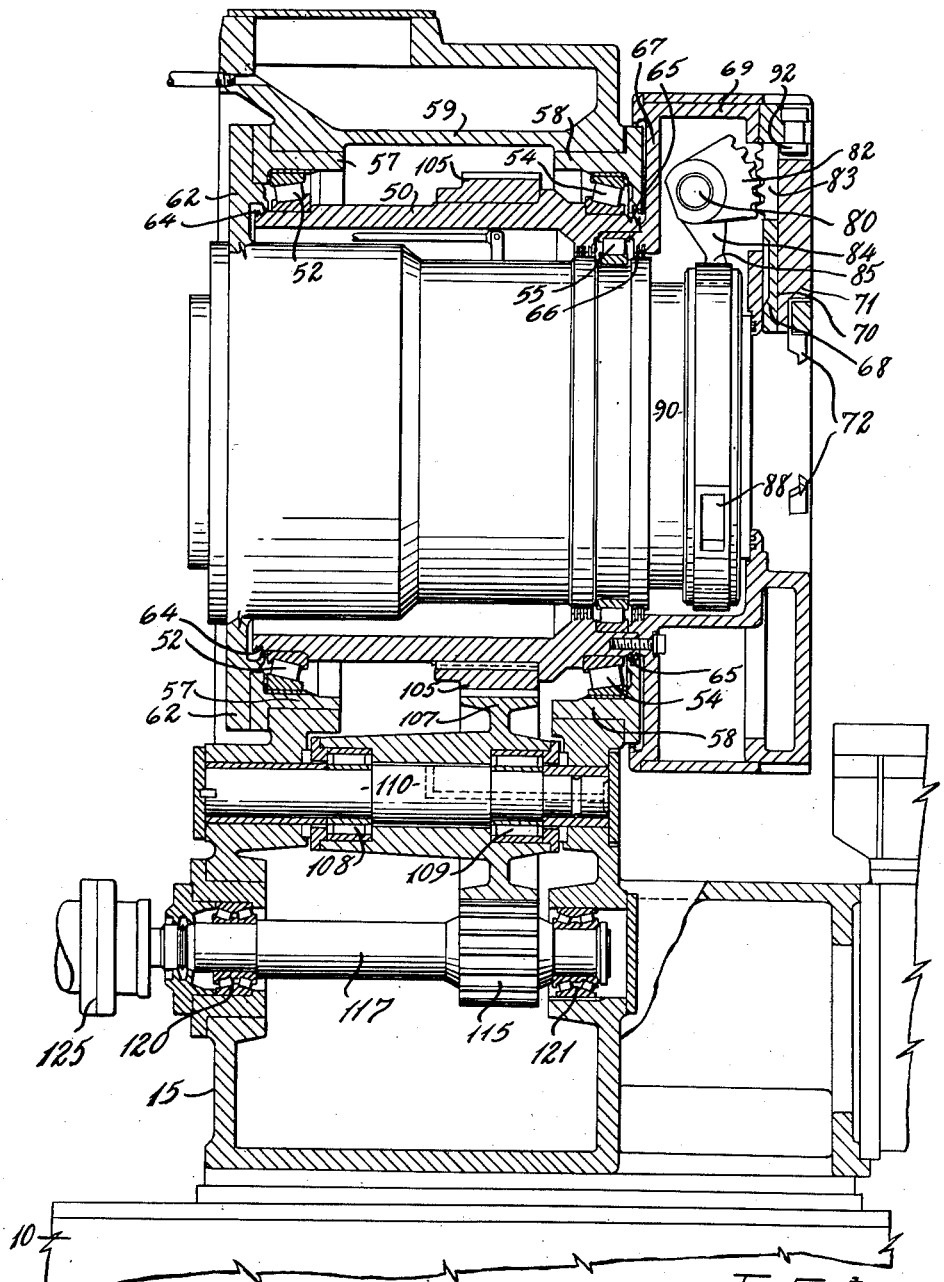

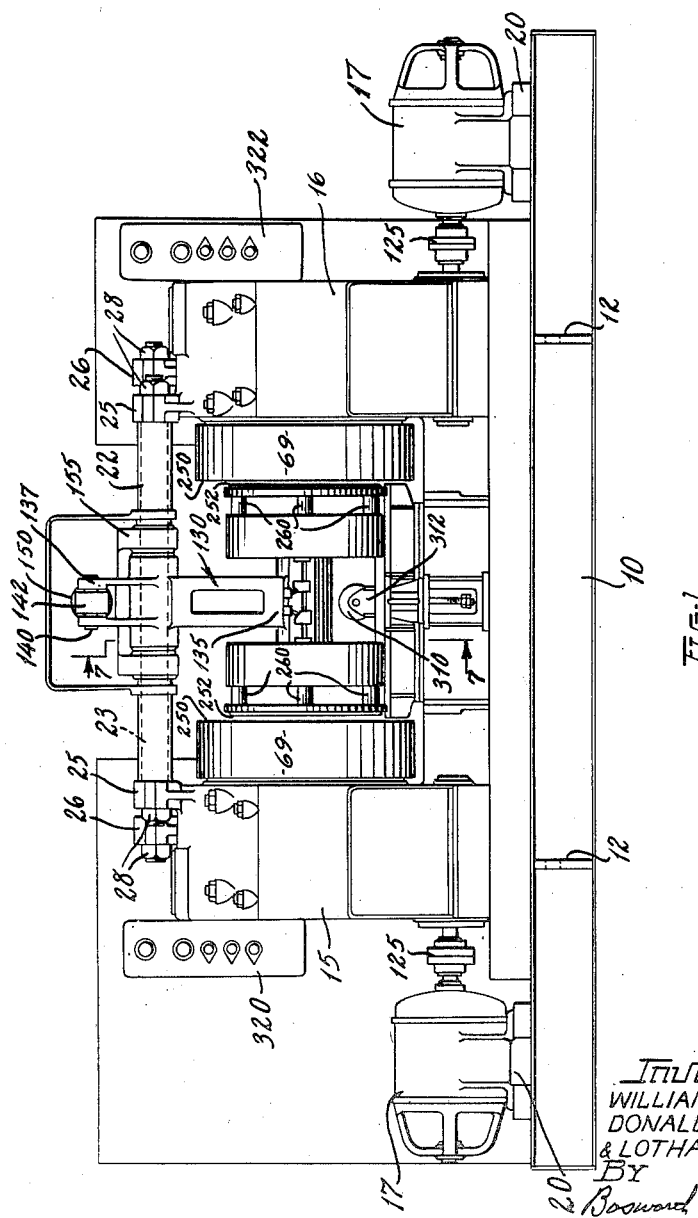

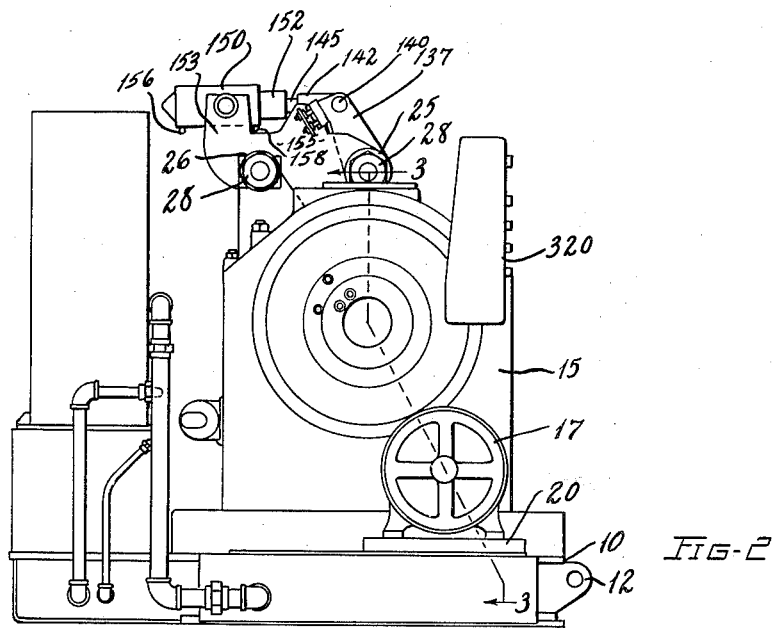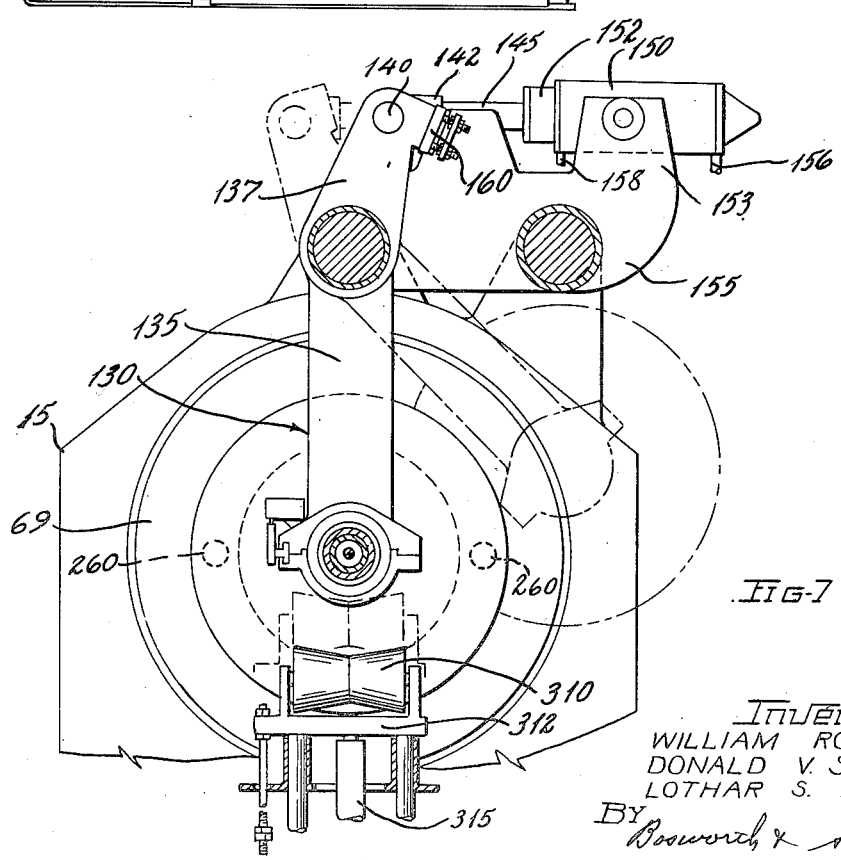

July 29, 1952 W. RODDER ET AL 2,604,690
CUTOFF MACHINE
Filed Aug. 14, 1946 6 Sheets-Sheet 3

INVENTORS
WILLIAM RODDER,
DONALD V. STROCK, &
LOTHAR S. HEYM
BY Bosworth & Sessions
ATTORNEYS Inventors
WILLIAM RODDER,
DONALD V. STROCK, &
LOTHAR S. HEYM
By Bosworth & Sessions
Attorneys July 29, 1952  W. RODDER ET AL  2,604,690
CUTOFF MACHINE
Filed Aug. 14, 1946  6 Sheets-Sheet 6

INVENTORS
WILLIAM RODDER,
DONALD V. STROCK, &
LOTHAR S. HEYM
By Bosworth & Sessions
Attorneys Patented July 29, 1952

2,604,690

UNITED STATES PATENT OFFICE 2,604,690

CUTOFF MACHINE

William Rodder and Donald V. Strock, Youngstown, and Lothar S. Heym, Poland, Ohio, assignors to The Aetna-Standard Engineering Company, Youngstown, Ohio, a corporation of Ohio Application August 14, 1946, Serial No. 690,352

11 Claims. (Cl. 29—33)

This invention relates to a machine for operating on workpieces such as pipe and particularly to a pipe cutoff machine for cutting off and dressing the end of a piece of pipe or the like. In the following specification the use of the word pipe is intended to mean any workpiece that a machine built in accord with this invention may operate on.

In the preparation of pipe for use in pipe lines and similar installations it is necessary to cut off each end square and then frequently also to dress the end with an internal chamfer if the pipe is to receive a threaded or other form of fitting. Since pipe so prepared is used in considerable quantities and is often large in size and heavy in weight it is desirable to facilitate these machining operations to as great a degree as possible by providing a pipe cutoff machine rapidly to handle and operate on the pipe ends.

To meet this and other conditions it is a general object of the present invention to provide a machine of the type outlined in which the operations of cutting off and dressing workpieces such as pipe and like shapes may be accomplished with the least handling and in a minimum of operating time. Another object is to provide such a machine through which the pipes may be fed in a straight line and in which both ends of the pipes may be cut off and dressed or chamfered without reversing the pipes after one end has been operated on. A further object is to provide an improved machine in which a pipe may be gripped by a collet mechanism and held stationary by it during all the operations performed on one of the pipe ends. Another object of the invention is to provide a machine in which the forward end of one pipe and the rearward end of another and adjacent pipe may be operated on at the same time. Still an additional object of the invention is to provide mechanism for simultaneously gripping the forward end of one pipe and the rearward end of another pipe so their opposed ends are in alignment and spaced apart and then inserting a tool head between the pipes simultaneously to operate on their opposed ends. Still a further object of the invention is to provide for simultaneously operating on the forward end of one pipe and the rearward end of a second pipe in axial alignment with the first by tool heads concentric with the pipe holding means and then by a tool head that is positioned between the opposed ends of the pipes. Still another object of the invention is to provide a pipe reaming machine in which a tool head is mounted so it can be swung between two spaced pipe ends after cutting and then expanded axially to move tools carried thereby into position simultaneously to engage each pipe end to be reamed. Another object of the invention is to provide an improved assembly of tool holders and chucks to cooperate in performing a plurality of operations on a piece of pipe or the like and also to operate simultaneously on a plurality of pipes.

Other objects of this invention will become apparent from the following specification and from the accompanying drawings describing a preferred form of the same; the novel features are summarized in the claims.

Figure 4:
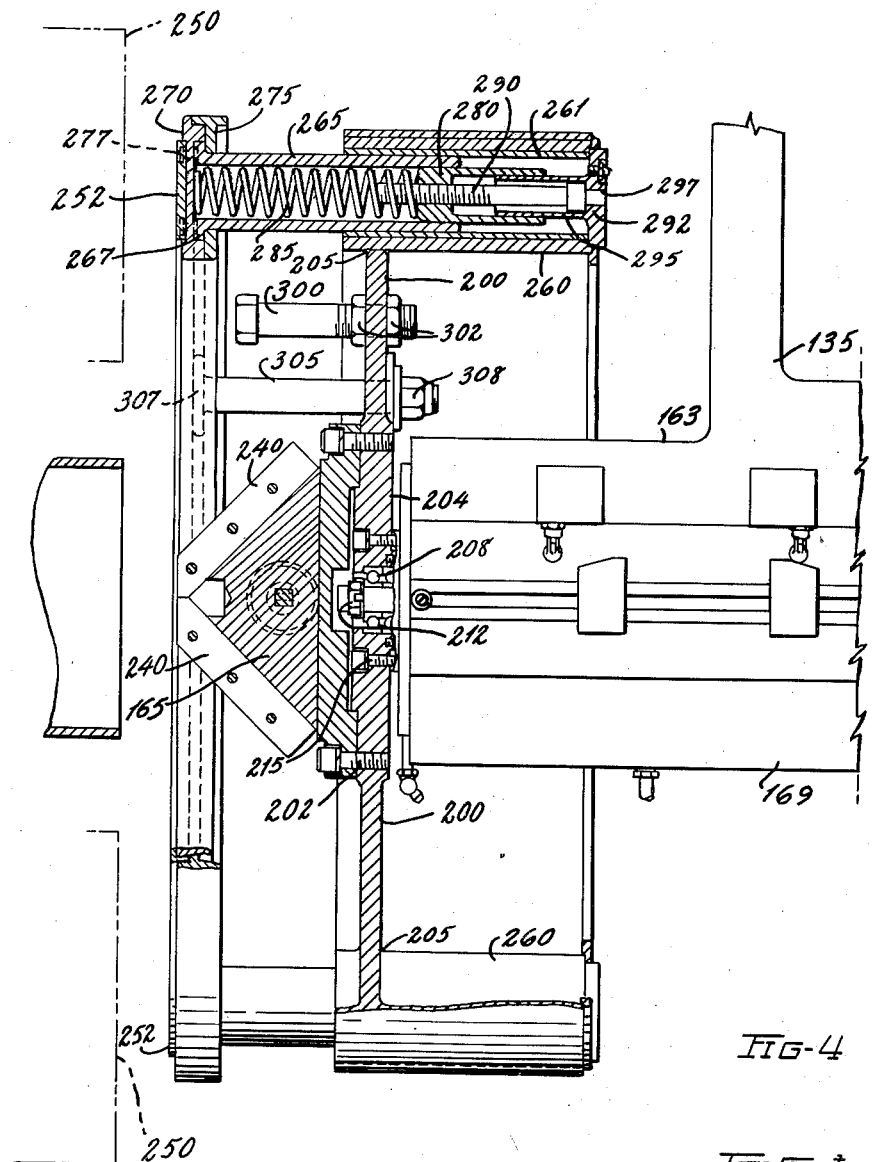
Figure 5:
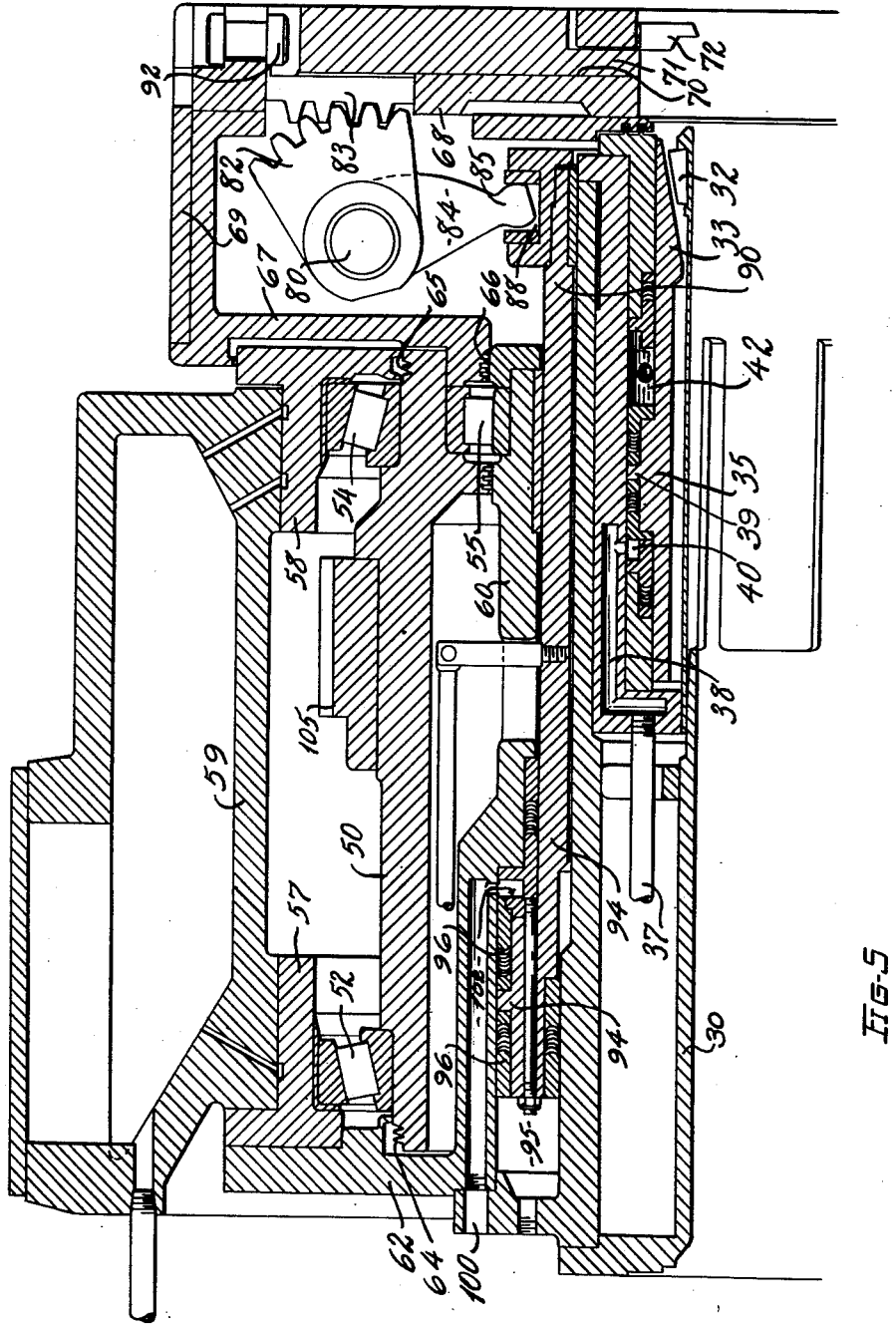
Figure 6:
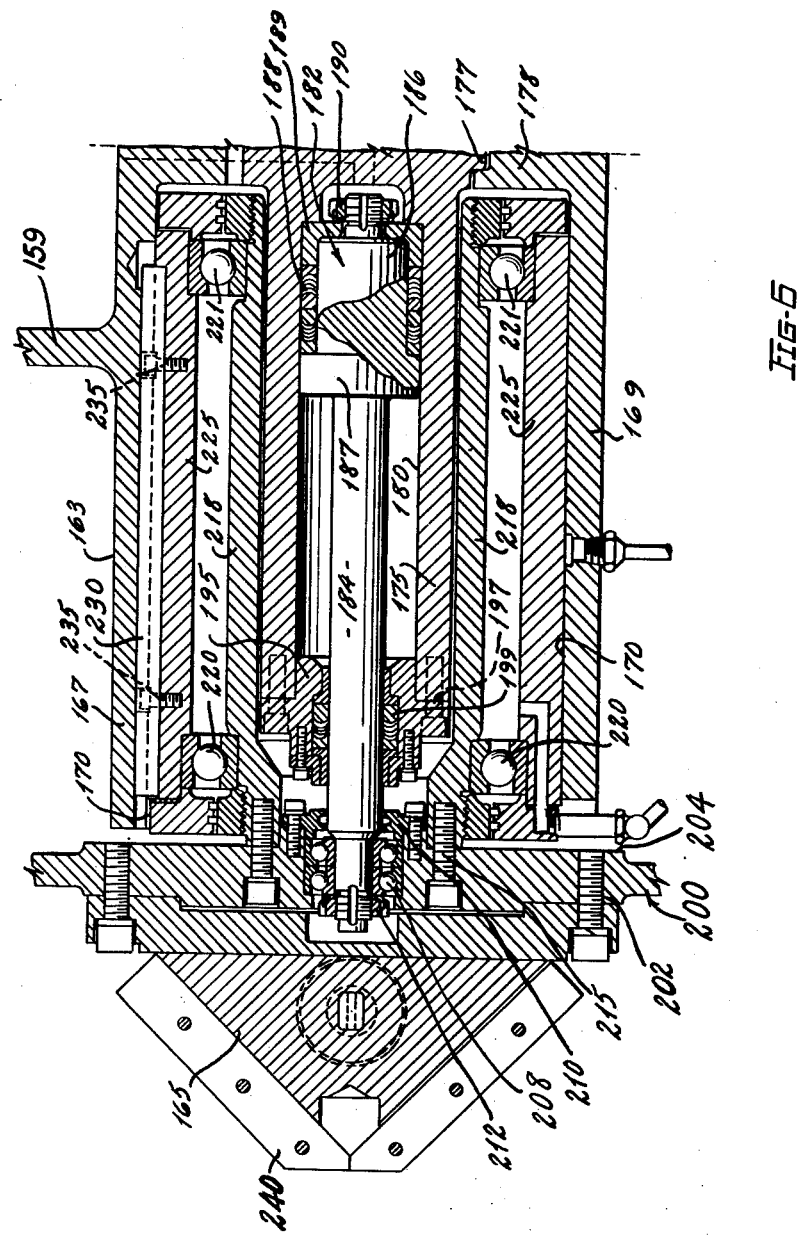

Referring now to the drawings: Figure 1 is a side elevation of one form of machine built in accordance with the present invention; Figure 2 is an end elevation of the machine; Figure 3 is a view partly in section and partly in elevation as indicated by the lines 3—3 on Figure 2; Figure 4 is a vertical section through one-half of the central tool head and its associated mechanism that is adapted to be positioned between spaced pipe ends; Figure 5 is an enlarged axial section through the chuck and chuck operating mechanism in the upper part of Figure 3; Figure 6 is an enlarged axial section in the plane of Figure 4 and through the central portion of that figure, and; Figure 7 is a section through Figure 1 as indicated by the lines 7—7 thereon.

In general the present machine is preferably formed of two substantially identical but reversed end frames in each of which is mounted a nonrotary collet type chuck and a rotating tool head with a cutoff tool. Each rotating tool head is driven by an individual motor adjacent the respective end frame. These end frames are spaced apart to provide between them room for a tool head that is swingably mounted on an axis parallel to and above the aligned cutter axes. This latter head carries two tools, separately operated, for engaging the opposed ends of two spaced and aligned pipes and two driving mechanisms for making frictional engagement with respective rotating tool heads to drive the former from the latter as desired.

A pipe that is to be operated on is so gripped in the first collet chuck in one end frame that the end to be cut off is adjacent the cutoff tools on the associated rotary cutter head. At the desired time the cutoff tools are rotated and shifted in a generally radial direction to engage the pipe and cut off the end. After this operation has been completed and while the pipe remains in the chuck a chamfering or reaming tool carried by the swingably mounted tool head is moved axially into contact with the pipe end and frictionally driven by the adjacent cutter head to form, for example, an internal bevel or chamfer in the pipe.

After the forward end of a pipe has been operated on in this manner the swingable head is moved out of alignment with the pipe and the pipe is passed along the axis of the aligned chucks over a conveyor into the collet chuck of the other end frame where it is gripped when its rear end is in proper registration with the adjacent cutoff tools of the associated rotary tool head to cut the pipe to the desired length. At the same time, or immediately thereafter, a second pipe is fed into the first end frame and gripped by its collet chuck so that is forward end is in registration with the associated tools. The cutoff tools of each cutting head are then fed, preferably simultaneously, inwardly until the rearward end of the one and the forward end of the other pipe are removed. After this operation the reamer tool head, which by then has been moved into axial alignment with the pipes, is actuated so that each reaming or chamfering tool is moved axially into engagement with the adjacent pipe ends and is then frictionally driven by the adjacent cutter tool heads to chamfer the insides or otherwise dress the two pipe ends. These dual operations may be continued indefinitely as long as pipes are available to the machine.

The invention is not to be construed as limited only to a machine to perform the cutting off and inside chamfering operations described. It will be apparent that it may be used in operating on workpieces with other shapes than those of pipes and to perform other operations as long as the tool heads and related parts described above operate generally as indicated.

Referring now to the drawings and particularly to Figures 1 and 2 the machine of the present invention is mounted on a bed 10 made up of H-beam stringers lying lengthwise of the machine and joined by cross members 12 lying at right angles to them and welded in place. The bed is provided with a bottom plate (not shown) to form an enclosed oil reservoir. Lift hooks are provided on opposite sides of the bed to permit it to be lifted by a crane. At each end of the bed are end frames 15 and 16 that may be formed of cast sections as best shown in Figures 1 and 3 and that are rigidly attached to the bed. Two individual motors 17 to drive the mechanism in each end frame 15 or 16 are mounted on blocks 20 that in turn are secured to the bed 10.

The end frames are held rigidly with respect to each other by the bed and are connected and braced by heavy tie rods 22 and 23 that also serve to support the swingably mounted reamer tool head mechanism. The tie rods are each mounted in cored bosses 25 and 26 integral with end frames 15 and 16 and are held in position by suitable nuts 28. Each end frame is substantially identical with the other except that the component parts of the two are reversed with respect to each other to provide for right and left hand operation. The left hand end frame (Figure 1) carries the mechanism for operating on the forward end of a pipe since the pipes are adapted to pass through the machine from left to right along the central line or common chuck axis indicated and the right hand end frame 16 carries the mechanism for operating on the rearward end of a pipe. Due to the fact that the end frames are substantially identical the construction of only one, namely the left hand frame 15, will be set out in detail.

Each end frame includes a plurality of concentric components mounted for sliding or rotative movement relative to each other or the fixed frame. A collet sleeve that is at all times rigid with the end frame is provided with jaws that move a short distance radially to engage and disengage a workpiece. The workpiece is operated on by tools carried by a tool supporting ring mounted for rotation about the chuck axis and including elements to move the tools into and out of engagement with a workpiece.

A collet actuating ring and a tool feeding ring are each mounted for independent reciprocation, with respect to the end concentric with the chuck axis but are not rotatable therein.

The construction of the left hand end frame is shown in Figures 3 and 5 and includes the stationary collet chuck held by the frame and rotary tool head that is concentric with the chuck and carries cutoff tools to remove the end of a pipe or other workpiece held therein. The chuck is of usual construction and is mounted in a horizontal position and in axial alignment with its complementary chuck in the other end frame. It includes a sleeve 30 through which a pipe is passed until it is in registration with annularly disposed fingers or jaws 32 that are cammed inwardly to hold the pipe or other workpiece in position to be operated on. The collet jaws are supported with respect to the sleeve 30 by spring members that normally tend to spring them outwardly and they are moved inwardly by the camming action of a tapered surface 33 on a collet actuating ring 35. The ring is concentric with the chuck and is reciprocated parallel with the chuck axis to move the collet jaws.

To reciprocate the ring 35 fluid under pressure is admitted through pipe 37 and passage 38 to one side of an annular piston 39 in an annular cylinder opening 40. This fluid acts to push the ring 35 toward the right (Figure 5) so that the tapered surface 33 closes the collet jaws. When it is desired to release the jaws fluid under pressure is admitted to the opposite side of the annular piston 39 through a passage 42 to move the same toward the left (Figure 5) and permit the jaws to open due to the spring in them where they are secured to sleeve 30. The shifting of the collet actuating ring 35 may be synchronized with other steps in the operation of the machine as hereinafter described.

A workpiece that is held by the stationary chuck jaws 32 is engaged by tools that rotate about the central axis of the chuck. These tools are carried by a tool supporting ring made up as an assembly of several component parts as best shown in Figure 5. This assembly comprises an irregularly shaped sleeve 50 that is mounted for rotation in the end frame on a pair of spaced outer tapered roller thrust bearings 52 and 54 and by an internal roller bearing 55. The outer bearings have external races fixedly supported in members 57 and 58 secured to the outer portion 59 of the end frame. The bearing 55 is provided with an internal race carried by a sleeve member 60 that is rigid with the end frame and connected therewith through a radial flange 62. Seals at 64, 65 and 66 prevent leakage into other parts of the end frame of lubricant supplied to the bearings.

The tool supporting ring is provided at one end with a hollow annular structure bounded by two radial sides 67 and 68 and an outer annular member 69 all secured to each other and through the member 67 secured to the right hand end (Figure 5) of the sleeve 50. Pipe cutoff tools are slideably mounted in the tool head assembly for movement transversely of the chuck axis into and out of engagement with a workpiece. To this end three equally spaced radially disposed slideways are provided in the outer side 68. A tool holder 71 carrying a cutting tool 72 is mounted in each slideway for movement toward and from a workpiece in the chuck.

In order to move each tool holder in synchronism with the others with respect to a workpiece, bell crank levers pivoted at 80 to the tool head assembly are provided. One arm of each lever is provided with a gear segment 82 that meshes with a rack section 83 on the adjacent tool holder 71. The other arm 84 of each bell crank is provided with a rounded end 85 that seats within an annular ring 88 extending around the end of a tool feeding ring 90. The ring 90 is non-rotatably mounted with respect to the frame, but may be slid back and forth axially thereof. When it is slid to the right hand end of its travel (Figure 5) the crank levers pivoted at 80 will move the tool holders 71 and the tools 72 to their outermost position away from a workpiece against a stop 92. When the tool holders are to be moved into engagement with a workpiece the ring 90 is moved toward the left.

Movement of the tool feeding ring is accomplished through fluid pressure applied to an annular piston 94 integral with the ring and seated within an annular cylinder 95 in the end frame. Suitable packing 96 prevents leakage between the piston and cylinder. When fluid under pressure is admitted at 100 through passage 102 against the right hand side of the piston the ring 90 is pushed toward the left and the tools 72 are moved inwardly to engage and traverse the workpiece to cut off the end. The tools are withdrawn from engagement with the workpiece by admission of fluid under pressure to the opposite side of the piston 94 through port 102. In each case the pressure is released on the inactive side of the piston.

The tool head assembly including the tool supporting ring is rotated on its bearings in the end frame by a ring gear 105 secured thereto. As shown in Figure 3 this ring gear is engaged by an intermediate drive pinion 107 mounted on bearings 108 and 109 for rotation about a shaft 110 fixed in the end frame. The intermediate pinion 107 is driven by a drive pinion 115 keyed to a shaft 117 carried in anti-friction bearings 120 and 121 in the end frame and driven by the motor 17 through a coupling 125.

As stated above, the mechanism just described in connection with the left hand end frame is duplicated on the right hand side of the machine except that the parts are reversed so that in the first case the cutoff tools are at the left hand side of the end frame and in the second case at the right hand side.

In order to receive between them the swingably mounted reamer head or tool head mechanism indicated at 130, the end frames are spaced apart as shown in Figure 1. As in the case of the end frames, the reamerhead mechanism also comprises two substantially identical but reversed assemblies one of which is adapted to cooperate with each of the end frames heretofore described.

The tool head 130 is pivotally supported on the member 22 and is moved into and out of working position by a piston and cylinder mechanism fixed with respect to the end frames. As shown in Figure 7 the tool head 130 is supported by an arm 135 rotatably supported on the member 22. An extension 137 on the arm 135 is pivotally connected with a short sleeve 142 to which is secured a piston rod 145 that enters a cylinder 150 through a gland 152. The cylinder is pivotally mounted in brackets 153 integral with a cast frame 155 supported on the members 22 and 23. Pressure may be applied through a port 156 against a piston on the piston rod 145 to rock the tool head counterclockwise (Figure 7) about the member 22 out of working relation in alignment with the collet chucks in the end frames. In the same way fluid admitted under pressure to the port 158 will, in conjunction with gravity, move the tool head clockwise into a position in alignment with the collet chucks. The extent of this movement is governed by an adjustable stop 160.

When the tool head 130 is rocked about the member 22 into working relation with the chucks the tools carried by it may be moved axially to engage and operate on workpieces therein. The reamer head comprises two separate subassemblies to shift the two tools in opposite directions toward the respective chucks with which they cooperate. Since these assemblies are identical, but reversed in position to provide for right and left hand operation, or for independent operation of either one of the units, the construction of only one of them will be described. This assembly is shown in Figures 4 and 6 as the left hand one, which cooperates with the mechanisms carried by the left hand end frame.

The arm 135 that is pivotally mounted on the member 22 comprises two sections, one of which, indicated at 159 in Figure 6, supports the left hand assembly and terminates in a hollow casting 163, in which is mounted the mechanism for actuating a tool holder 165 for operating on the end of a pipe in the adjacent chuck. The casting 163 includes an annular and generally cylindrical side wall portion 167 that cooperates with a side wall portion 169 at the bottom of the tool head. These two side wall portions may be cast integrally with each other and the internal portion bored out or they may be made separately and secured together along lines parallel to the cylinder axis. In the present embodiment the former type of construction is employed and provided with a center bore 170.

A tool holder operating cylinder 175 is centrally disposed within the bore 170 and suitably secured in alignment with it. This cylinder is provided at its inner end with a flange 177 that engages a complementary flange in a radial end wall 178 of the casting 163 to prevent movement of the cylinder toward the left (Figure 6). This cylinder casting is machined to provide a central bore 180 in which is mounted a piston 182 and a piston rod 184. The piston comprises a central portion 186 on one end of which is formed an enlarged portion 187 to furnish an abutment for suitable packing 188. An end cap 189 is provided at the other side of the packing and the whole is held together by a nut 190 secured to the threaded shank at the right hand end of the piston as shown. The piston rod 184 passes out of the end of the cylinder through a cap 195 bolted thereto and provided with sealing packing.

In the mechanism that has just been described those portions of the tool head within the bore 170 and comprising the portions 167, 169 and 178 are held as a unit with the cylinder 175. The piston and piston rod 184 are mounted to slide with respect to these parts but do not rotate with respect to them.

The tool holder 165 is operatively connected to the left hand end of the piston rod and rotates with respect to it. To make this connection an annular plate 200 is provided as shown in Figure 4 and the tool holder is bolted to it at 202. The plate is made up of a central section 204 and an outer annular flat ring portion 205. The portion 204 is recessed to receive the outer race of a ball thrust bearing 208, the inner race of which is secured to a spindle formed at the end of the piston rod 184. The outer race is secured in position by a plate 210 (Figure 6) bolted to the central portion 204 and the inner race is held on the spindle by a nut 212.

The ring 200 and tool holder 165 carried thereby are secured by bolts 215 to a central sleeve 218 mounted for rotation in the bore 170 on ball bearings 220 and 221 (Figure 6). The said sleeve 218, the ring 200 and the tool holder 165 all rotate with respect to a sleeve 225 that supports the outer races of the aforementioned ball bearings. The sleeve 225 does not rotate with respect to the casting 163, being held against rotation by a key 230 secured to it at 235 and slidably mounted in an axially extending key way in the member 167. Thus by reason of being mounted in sleeve 225 the tool holder, the ring 200 and the sleeve 218 may be slid back and forth within the recess 170 by the piston 182 toward and away from the adjacent chuck.

To reciprocate the tool holder 165 and sleeve 225 fluid under pressure is supplied through suitable openings to one or the other side of the piston 182 and at the same time the other side of the piston is opened to exhaust. As fluid pressure is established at the right hand side of the piston (Figure 6) the tool holder 165 and a tool 240 mounted thereon are moved to the left until the tool engages a workpiece held in the adjacent chuck and moves through a predetermined length of cutting stroke along the workpiece. When fluid pressure is established on the left side of the piston 182 the tool is withdrawn toward the right.

At the time the tool 240 is shifted the plate 200 and all of the parts secured thereto also are shifted axially of the tool head and as the tool is moved into engagement with a workpiece a driving connection is established between a friction driving surface 250 on the outer member 68 of the tool supporting ring 50 concentric with the adjacent chuck. This friction surface is engaged by a friction ring 252 that is supported by the member 200 as will now be described.

At the outer end of the plate 205 are four cylinders 260 (Figure 4) mounted with their axes parallel to the axis of the bore 180. In each of these cylinders are liners 261 that support a sleeve 265 provided at the outer end with a flanged shoulder portion 267. This shoulder portion bears at one side against a ring 270 to which is secured the friction member 252. At the other side of the shoulder 267 engagement is made with a ring 275 and the rings 270 and 275 are secured together by suitable bolts. The member 252 is riveted at 277 to the ring 270.

The end of the sleeve 265 remote from the shoulder portion 267 surrounds a plug 280 that provides a stop for one end of a compression spring 285. The other end of the spring engages the ring 270 normally to push the friction member 252 toward the left (Figure 4). The plug 280 is centrally bored and threaded to receive a bolt 290 whose head bears against a cap 292 secured to the cylinder 260 while it is guided in a sleeve 295 that in turn guides the plug 280. Through an opening 297 in the cap 292 a suitable wrench may engage a socket in the head of the bolt 290 and by its rotation move the plug 280 back and forth to adjust the tension in the spring 285. The bolt head bearing against the cap 292 prevents the spring 285 from pushing the plug 280 indefinitely toward the right (Figure 4).

As the piston 182 moves the member 200 toward the left (Figure 4) the friction member 252 engages the opposed face 250 of the adjacent tool supporting ring 50 that in turn is in rotation due to the geared connection previously described from the motor 17 to the gear 105. As a result the tool 240 and its associated mechanism rotates in unison with the adjacent tool operating ring 50 to drive the tool with respect to the workpiece.

The extent to which the tool may be moved axially is governed by two stops as shown in Figure 4. Movement toward the left is limited by a stop 300 adjustably secured by nuts 302 to the ring 200. Movement toward the right is limited by a pin 305 with a head 307 bearing against ring 275 and an adjusting nut 308 bearing against the ring 200. The friction member 252 and its supporting rings may move back and forth between these two stops although it is normally urged toward the left (Figure 4) by the spring 285.

After the tool head 130 and the tools 240 have performed their function of dressing the ends of workpieces in either or both of the chucks this tool head is moved by the piston and cylinder mechanism 175 to the inactive position shown in dotted lines in Figure 7. At this time there is an unobstructed space between the two chucks along their common axis. A workpiece that has been operated on in the left hand end frame (Figure 1) is then moved along this axis into the chuck of the right hand end frame in order that its opposite end may be dressed.

A conveyor shown in Figures 1 and 7 is moved into position to facilitate the shifting of the workpiece. The conveyor mechanism comprises a roller 310 mounted for rotation about an axis normal to the chuck axis in supports 312. When the roller is in the dotted line position of Figure 7 it provides a rolling support for the workpiece that is in transit from the left to the right as in Figure 1. After a workpiece has been moved across the conveyor to the right hand end frame (Figure 1) the conveyor is lowered to the solid line position of Figure 7 in order that the tool head 130 may be rocked about the member 22 by the piston mechanism 175 and lowered from the dotted line position to the solid line position in that figure.

The conveyor roller 310 is supported for vertical movement by a piston and cylinder mechanism 315 in which the piston is rigid with the supports 312 and the cylinder is supported on the bed 10. Suitable mechanism of a type that is well known and is not further described may be provided to admit fluid under pressure to either the lower or upper side of the cylinder to raise or lower the conveyor roller.

From the foregoing description it will be seen that a workpiece may be mounted in the chuck in the left hand end frame 15 and operated on by rotating tools 72 to cut off the end thereof. Subsequent to the cutting off operation the adjacent tool 240 of the tool head 130 may be moved axially of the chuck axis to perform another operation, such as chamfering, on the workpiece. It will be evident that a workpiece that is clamped in the chuck of the right hand end frame 16 may be operated on at the same time and in a similar manner. To shift a workpiece from the left to the right hand end frame so that the rearward end, as distinguished from the forward end, may be operated on, the conveyor mechanism embodying the roll 310 is moved up into operative position after the tool head 130 has been swung out of the way to the dotted line position of Figure 7.

The operations that have been described for cutting off and reaming or chamfering the ends of a piece of pipe are illustrative of the type of operation that may be performed with the machine of the present invention and it is to be understood that the machine may be adapted to various other operations on a workpiece without departing from the scope of the claims.

Control mechanism may be provided to synchronize the operations on workpieces in both the right hand and left hand end frames so that they may be performed simultaneously and in predetermined succession. Furthermore the operations in each end frame of shifting the collet chuck actuating ring to clamp the workpiece and the tool feeding ring thereafter to cut off the end may be controlled automatically and in succession. In like manner the movement of the conveyor roller 310, the tool head 130 and the tools 240 to perform their functions in the operation of the machine may be timed to follow the chuck clamping and cut off operations in a predetermined sequence.

To operate such controls effectively panels 320 and 322 respectively may be provided on the end frames 15 and 16 to furnish the operator easy access to such mechanism. With such a panel and the mechanism of the control system it is possible to control the machine automatically through an entire sequence from feeding the forward end of a workpiece into the left hand chuck until the rearward end of the same workpiece is in turn released by the right hand chuck. Such control mechanism is illustrated in copending application Serial No. 690,353, filed in the name of William Rodder on August 14, 1946, even date herewith and entitled Tool Feed Control Device, and now abandoned.

From the foregoing description it will be seen that the present invention provides a machine efficiently to operate with a plurality of cutting tools on one or both ends of a workpiece and that opposite ends of the workpiece may be engaged by the tools without reversing it end for end and by merely passing the same along a straight line path from one chuck to another. Further it is possible with this invention to provide a plurality of tool heads to operate on the end of a workpiece and to drive each tool that engages the workpiece from a single drive motor or other source of power. Thus it is possible to dress the ends of workpieces efficiently, rapidly and economically and to treat a series of workpieces in succession as they are passed one after another through the machine from one chuck and across the conveyor to and through the other chuck.

We claim:

1. In a machine of the class described, two spaced end frames, a chuck member in each end frame, said chuck members being in axial alignment each with the other, a tool head shiftably mounted with respect to said frames and adapted to be shifted to and from a position between said chuck members, tool members carried by said tool head for simultaneous movement in generally opposite directions into and out of engagement with work pieces mounted in the adjacent chuck members, and means to rotate one of said members with respect to the other.

2. In a machine of the class described, two spaced end frames, a chuck in each end frame in axial alignment each with the other, a tool head shiftably mounted for movement into and out of alignment with said chuck axis to permit movement of a workpiece from one chuck to the other along their common axis, tools carried by said tool head for independent simultaneous movement into and out of engagement with workpieces mounted in each of the adjacent chucks, means to shift said tools into engagement with a workpiece in each of said chucks, and means to effect relative rotational movement between each tool and a respective chuck to enable said tools to operate simultaneously on the workpieces in said chucks.

3. In a machine of the class described, comprising, a frame, a chuck in said frame, a first tool head rotatably carried by said frame, a second tool head, a tool carried by said first tool head for movement into and out of engagement with a workpiece in said chuck, and a tool carried by said second tool head for movement into and out of engagement with said workpiece, the improvement in driving said tools which consists of drive members on each of said tool heads, means to shift one tool head toward the other to engage said members and to drive one tool head from the other tool head, and power means to drive said other tool head.

4. In a machine of the class described, two spaced end frames, two spaced and opposed chucks one mounted in each end frame, a tool head shiftably mounted to be moved between a non-operative position out of the space between said chucks and a working position between said chucks, tools carried by said tool head for axial movement into and out of engagement with workpieces mounted in the adjacent chucks, means to move said tools individually with respect to said tool head toward a respective chuck, an axially stationary drive means surrounding each chuck and having a common axis therewith and means operative consequent upon movement of a tool toward the adjacent chuck to effect a driving connection between said tool and a respective drive means to rotate the former from the latter.

5. In a machine of the class described, two spaced end frames, chucks fixedly mounted in each end frame in axial alignment each with the other, conveyor means to facilitate movement of a pipe only along the common axis from one chuck to the other, means comprising a fluid cylinder and piston to move said conveyor means to an active or inactive position, a tool head shiftably mounted to be moved between a non-operative position out of alignment with the chuck axis and a working position in alignment with said chuck axis, a fluid piston and cylinder one carried by the machine and one by said tool head to shift said tool head, tools carried by said tool head for axial movement simultaneously in opposite directions into and out of engagement respectively with a pipe mounted in each of the adjacent chucks, a drive member associated with each chuck and mounted for rotation about said chuck axis, power means to rotate said members and means to connect each tool to the adjacent drive member to rotate said tool with respect to the associated chuck.

6. In a machine of the class described, two spaced end frames, chucks fixedly mounted in each end frame in axial alignment each with the other, conveyor means to facilitate movement of a pipe along the common axis from one chuck to the other, means to move said conveyor means to an active or inactive position, a tool head swingably mounted on an axis parallel to said chucks and spaced therefrom to permit said tool head to be swung between a non-operative position out of alignment with the chuck axis and a working position in alignment with the chuck axis, means to swing said tool head into said non-operative position and said working position, tools carried by said tool head for axial movement simultaneously in opposite directions into and out of engagement respectively with a pipe mounted in each of the adjacent chucks, a drive member associated with each chuck and mounted for rotation about said chuck axis, power means to rotate said members and means to connect each tool to the adjacent drive member to rotate said tool with respect to the associated chuck.

7. In a machine of the class described, a bed, two spaced end frames on said bed, a chuck in each end frame in axial alignment each with the other, a member at the top of said frames and parallel to the axis of said chucks to connect the same, a tool head shiftably mounted on said member to be shifted between a non-operative position out of alignment with the chuck axis and a working position in alignment with said chuck axis, a second brace member connecting said end frames and parallel to said first member, a piston and cylinder one connected to said tool head and one to said second member and operative upon application of fluid under pressure to shift said tool head, shiftable conveyor means supported by said bed between said chucks to facilitate movement of a workpiece only along the axis of said chucks from one chuck to the other, means to shift said conveyor means out of the path of said tool head when the same is moved to alignment with said chucks, and means to effect relative rotational movement between a tool in said tool head and said chucks.

8. In a machine of the class described, a frame, a chuck in said frame, a tool head swingably supported by said frame for movement between a non-operative position out of axial alignment with said chuck and a working position in axial alignment with said chuck, a rotatable member supported by said tool head for sliding movement toward and away from said chuck, means to slide said rotatable member with respect to said tool head, a tool holder carried by said rotatable member, an axially stationary drive member secured to said frame and rotatable about said chuck axis and operable to make driving engagement with said rotatable member consequent upon movement of said tool holder toward said chuck and power means to drive said rotatable member and thereby rotate said tool holder relative to said chuck.

9. In a machine of the class described, a frame, a chuck in said frame, a tool head swingably supported by said frame for movement between a non-operative position out of axial alignment with said chuck and a working position in axial alignment with said chuck, a cylinder carried by said tool head in position to oppose said chuck when said tool head is in said working relation, a piston in said cylinder, a rotatable member surrounding said cylinder and supported by said tool head, an operative connection between said rotatable member and said piston to shift the former toward and away from said chuck consequent upon application of fluid pressure to said piston, a tool holder carried by said rotatable member, a friction ring resiliently supported by said rotatable member with its friction surface normal to the axis of said chuck, an axially stationary drive member secured to said frame and rotatable about said chuck axis and operable to make driving engagement with said friction ring consequent upon application of fluid pressure to move said tool holder toward said chuck and power means to drive said drive member and thereby rotate said tool holder relative to said chuck.

10. In a machine of the class described, a bed, two spaced end frames on said bed each with a chuck mounted thereon and each chuck facing and aligned with the other along a common axis, an axially stationary drive member rotatably mounted on said bed, a tool head swingably supported by and between said frames for movement between a non-operative position out of working relation and alignment with said chuck and a working position in alignment and working relation with said chucks, two rotatable members including tool holders supported by said tool head for sliding movement toward and away from said chucks respectively, means to slide said rotatable members with respect to said tool head, means on each drive member to make driving engagement with a respective rotatable member and power means operative consequent upon movement of a respective rotatable member toward a chuck to drive that rotatable member relative to the adjacent chuck.

11. In a machine of the class described, two spaced end frames, a non rotary chuck in each end frame said chucks being in axial alignment each with the other, a tool head swingably mounted to be swung between a non-operative position out of working relation and alignment with said chucks and a working position in alignment and working relation with said chucks, fluid pressure means to swing said tool head, tools carried by said tool head for axial movement into and out of engagement with work pieces mounted in the adjacent chucks, fluid pressure means to move said tools individually with respect to said tool head toward a respective chuck, two axially stationary rotatably mounted drive means to drive said tools respectively in rotation with respect to said adjacent chucks and means operative consequent upon movement of a tool toward the adjacent chuck to effect a driving connection between said tool and a respective drive means to rotate the former from the latter.

WILLIAM RODDER.
DONALD V. STROCK.
LOTHAR S. HEYM.

REFERENCES CITED

The following references are of record in the file of this patent:

UNITED STATES PATENTS

| Number | Name | Date |
|---|---|---|
| 289,817 | Drummond et al. | Dec. 11, 1883 |
| 576,988 | Woodward | Feb. 9, 1897 |
| 1,419,936 | Lodd | June 20, 1922 |
| 2,058,940 | Arms et al. | Oct. 27, 1936 |
| 2,112,396 | Corrign | Mar. 29, 1938 |
| 2,160,476 | Dampmeier | May 30, 1939 |
| 2,211,183 | Tytus et al. | Aug. 13, 1940 |
| 2,262,178 | Gest et al. | Nov. 11, 1941 |
| 2,326,463 | Johnston | Aug. 10, 1943 |
| 2,373,472 | Haumiller | Apr. 10, 1945 |